United States Patent Office 2,925,023
Patented Feb. 16, 1960

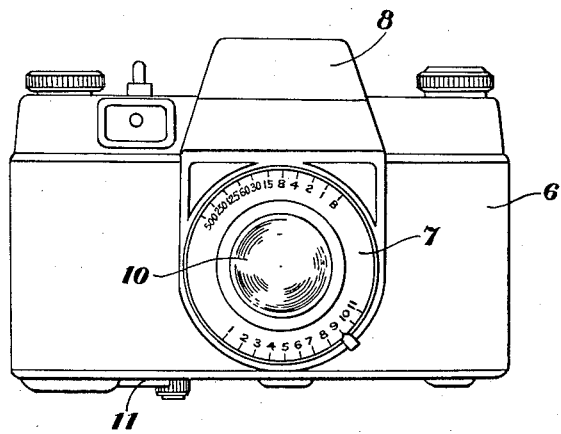
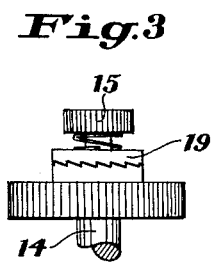
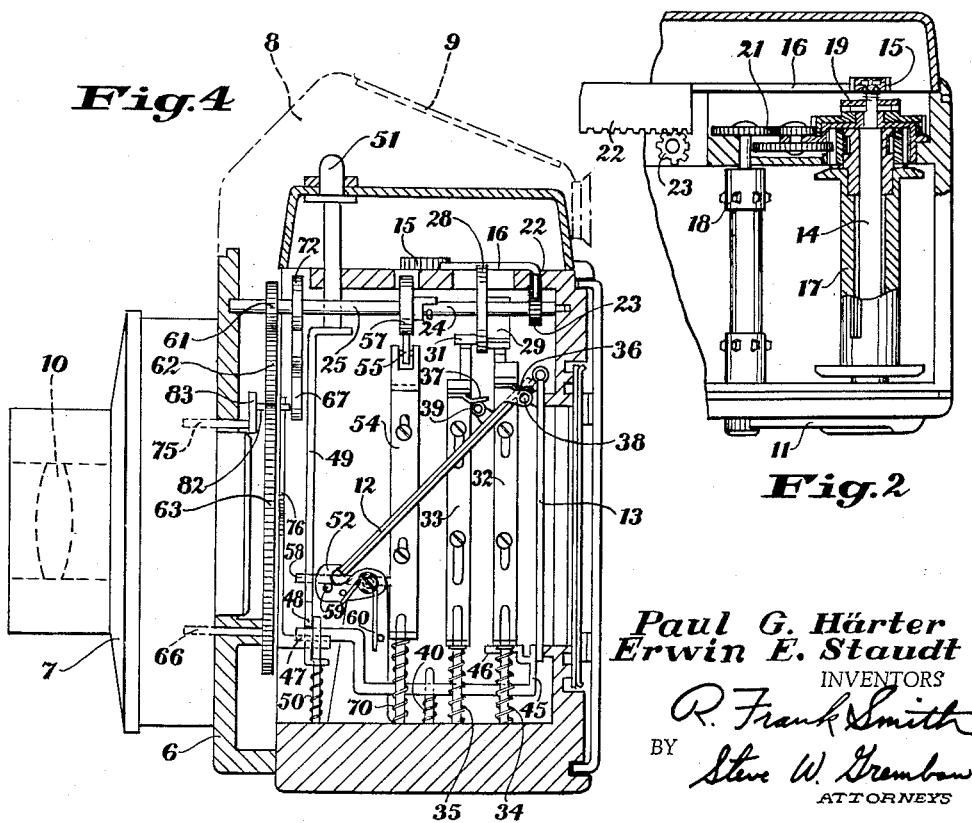

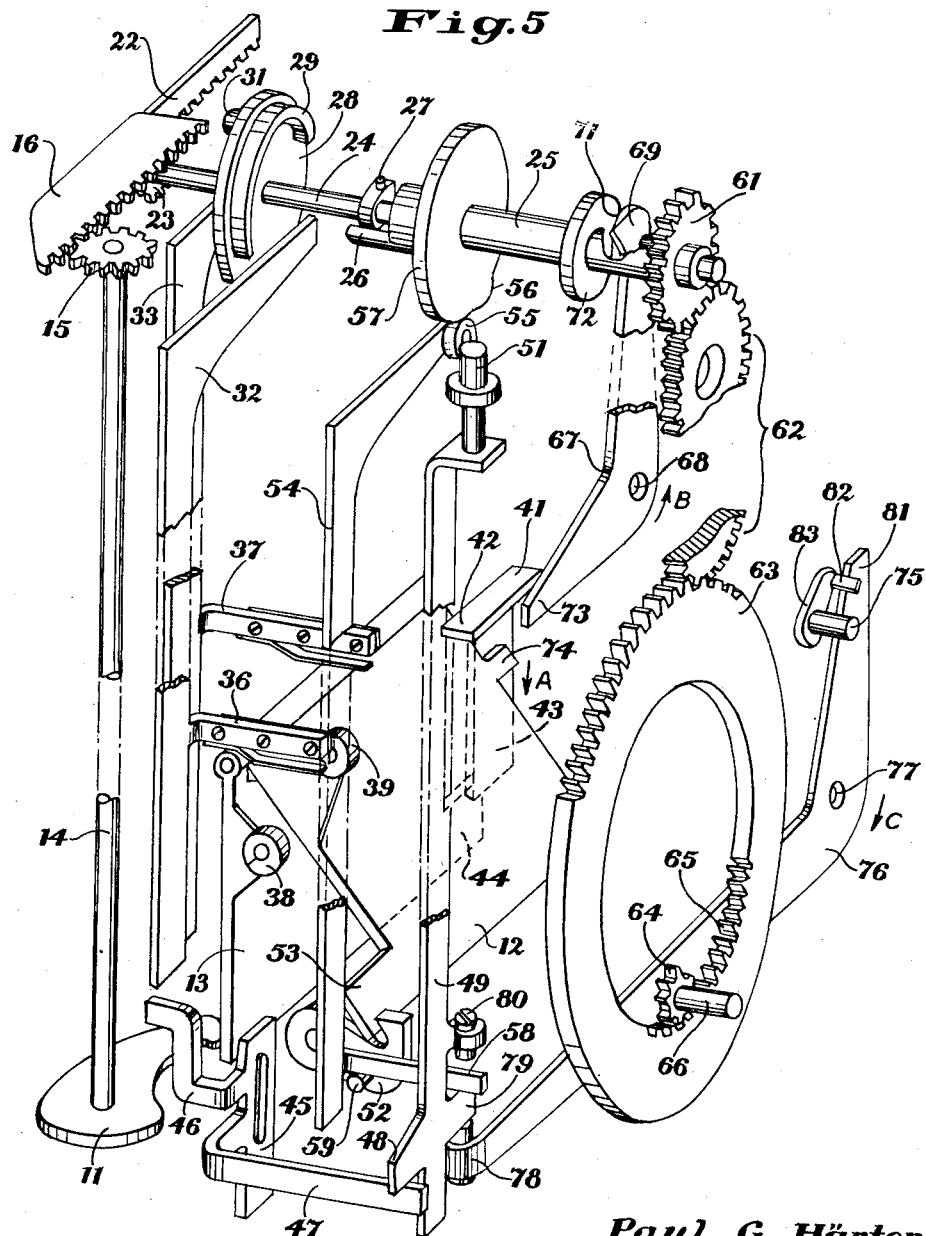

2,925,023

SHUTTER RELEASE MECHANISM FOR A SINGLE-LENS REFLEX CAMERA

Paul G. Härter and Erwin E. Staudt, Stuttgart-Wangen, Germany, assignors to Eastman Kodak Company, Rochester, N.Y., a corporation of New Jersey Application October 25, 1957, Serial No. 692,357

Claims priority, application Germany February 20, 1957

10 Claims. (Cl. 95—42)

This invention relates generally to cameras, and more specifically to an improved shutter release mechanism for a reflex camera of the single-lens type.

Reflex cameras having a shutter releasable by the mirror as it travels from a viewing position to a non-viewing position are well known. The mirror is said to be in a viewing position when it is disposed in a plane at an angle of 45 degrees with respect to the optic axis of the shutter objective lens, and reflects the image formed by the objective lens to a viewing screen. The mirror is in a non-viewing position when it has been tilted upwardly out of the path of the light rays which are free to strike the light sensitive photographic material. Reflex cameras of this type utilize a single shaft shutter, the shutter cocking lever being caried directly by the shutter, and cannot readily be adapted to a standard two-shaft shutter without completely redesigning and modifying the reflex camera. The two-shaft shutter has a release shaft and a shutter-cocking shaft and is adapted when released to run down into a shutter closed position and then to open and close to make an exposure as is well known. A shutter of this type is the Deckel shutter disclosed in British Patent No. 769,086. The present invention provides a reflex camera having an improved shutter release mechanism that eliminates all of the aforementioned difficulties.

One of the objects of the present invention is to provide an improved shutter release mechanism for a single-lens reflex camera that makes it possible to use a standard two-shaft shutter in connection therewith.

Still another object of this invention is the provision of an improved shutter release mechanism for a single-lens reflex camera having a first mechanism for releasing the shutter and a second mechanism for releasing the shutter-cocking spindle.

And a more specific object of the invention is the provision of an improved shutter release mechanism for a single-lens reflex camera in which a shutter trip member actuates a first mechanism for releasing the shutter, and the upwardly moving mirror actuates a second mechanism to release the shutter-cocking spindle.

Objects and advantages other than those set forth above will be apparent from the following description when read in connection with the accompanying drawings, in which:

Fig. 1 is a front view of a single-lens reflex camera of the type in which the structure of the present invention may be embodied;

Fig. 2 is a fragmentary view partially in section of a portion of the camera illustrated in Fig. 1 showing the gear train for rotating the take-up spool and the film-measuring roller;

Fig. 3 is an enlarged fragmentary view of a portion of the structure of Fig. 2 showing the clutch arrangement for connecting the gear train to the film take-up spool;

Fig. 4 is a side elevation view in section of the control mechanisms of the present invention showing the slide bars, mirror, light-blocking flap and shutter release mechanism; and Fig. 5 is a perspective view of the mechanism for winding the film, cocking and releasing the shutter, and moving the mirror and light-blocking flap into and out of the light path. For the purpose of clarity, the camera body, lens and associated parts have been omitted in this view.

As shown in the drawings, this invention is embodied in a single-lens reflex camera 6 having a camera body to which a shutter 7 may be rigidly or detachably secured. The shutter 7 is a standard between-the-lens type shutter having two shafts such as disclosed in British Patent No. 769,086. The top of the camera 6 is provided with a device 8 having a viewing screen 9 for viewing an image formed by objective lens 10 of the shutter 7 and reflected to the screen by means to be later described. The bottom of the camera 6 carries an oscillating winding lever 11 which is connected to the film-winding and shutter-setting mechanism in a manner to be later described.

The structure for winding the film and moving a mirror 12 and light flap 13 into and out of the light path is substantially as shown and described in applicant's co-pending patent application Serial No. 577,681. Since this structure has been described in considerable detail in the aforementioned copending application, it is believed that a general description of this structure and how it functions should be sufficient for the purposes of this application. As shown in Fig. 5, the film winding is accomplished by the lever 11 mounted on one end of a shaft 14 and having a pinion 15 on the other end meshing with a gear rack 16 located inside the camera body. The shaft 14 which is disposed within the take-up spool 17 as seen in Fig. 2 is connected to the spool 17 and to a film measuring sprocket 18 through a one-way clutch 19 and gear train 21. The one-way clutch 19 drivingly connects the shaft 14 to the sprocket 18 and film spool 17 on the forward stroke of the winding lever 11, and disengages the shaft 14 from the sprocket 18 and spool 17 on the return stroke of the lever 11 as is well known.

A toothed section 22 of the rack 16 engages a pinion 23 carried by a shaft 24. One end of the shaft 24 is supported by a shutter cocking spindle 25 in axial alignment therewith and drivingly connected thereto by means of a lost motion connection shown as a coupling lug 26 and coupling pin 27.

A disk 28 is mounted on the shaft 24 and has an arcuate projection 29 on one side and a pin 31 on the other adapted to engage reciprocally movable slide bars 32, 33 respectively. The slide bars 32, 33 which are biased upwardly by springs 34, 35 as seen in Fig. 4 have laterally extending arms 36, 37 respectively adapted to engage rollers 38, 39 carried by the light flap 13 and mirror 12. The light flap 13 and mirror 12 are biased by springs, not shown, which tend to swing the flap 13 and mirror 12 in a counterclockwise direction as seen in Fig. 5 and out of the way of the exposing light rays which pass through the lens 10.

A T-shaped slide bar 41 is carried by the camera 6 and has an arm 42 formed by its upper end disposed in the path of the mirror 12, and a lower end 43 adapted to move in front of a lateral flange 44 of the light-blocking flap when the flap 13 is in front of the camera aperture as seen in Fig. 5. The slide bar 41 is urged by a spring, not shown, in the direction of arrow A to hold the flap 13 in the closed position thus preventing the light from striking the light-sensitive layer of the photographic material while the shutter 7 is open for the purpose of observing or viewing the subject which is to be photographed. Another structure for positively holding the light-blocking flap 13 in a viewing position comprises a slide bar 45 urged by a spring 40 as seen in Fig. 4. When the slide bar 45 is in this position, the upper end is disposed in front of the light-blocking flap 13 securing the flap in position in front of the aperture of the camera 6. The slide bar 45 has an arm 46 extending in the path of slide bar 32, and another arm 47 extending in the path of a lug 48 formed by a reciprocally movable slide bar 49 biased by a spring 50 as seen in Fig. 4 and having a shutter release button 51 at one end. Depression of the shutter release button 51 causes the lug 48 to engage and urge the arm 47 against the bias of the spring 40 and slide bar 45 against the bias of the spring 40 withdrawing the slide bar 45 from in front of the flap 13. The slide bar 49 further has an adjustable lug 80 for a purpose to be explained hereinafter.

The mirror 12 is held in viewing position by a pawl 52 urged by a spring 60 as seen in Fig. 4 in a direction to clamp a lateral flange 53 of the mirror 12. A reciprocally movable slide bar 54 biased by a spring 70 has a roller 55 at one end actuable by a cam 56 formed by a disk 57 secured to the spindle 25 causing a laterally extending arm 58 formed by the slide bar 54 to engage a pin 59 carried by the pawl 52 to urge the pawl in a direction against the bias of the spring 60 to permit the lower end of the mirror 12 to pass by the pawl 52 into the viewing position.

Primarily all of the structure that has been described in this application up to this point has been disclosed and described in greater detail in the aforementioned copending patent application. Applicant will now give a detailed description of the structure constituting an improvement thereover.

The shutter cocking spindle 25 has a gear 61 at one end thereof connected through gear 62 to a shutter ring gear 63 located within the camera body as seen in Figs. 4 and 5. A pinion 64 meshes with gear teeth 65 formed by the inner periphery of the ring gear 63, and is secured to a shutter-cocking shaft 66 which is rotatable therewith upon rotation of the ring gear 63 to cock the shutter 7.

The shutter-cocking spindle 25 is provided with an escapement mechanism comprising a lever 67 pivotally mounted to the camera at 68. One end of the lever 67 has a lug 69 for engaging a shoulder 71 formed by a disk 72 secured to the spindle 25 intermediate the disk 57 and gear 61. The lever 67 is constantly urged by a spring, not shown, in the direction of the arrow B, and its other end 73 extends in the path of a lug 74 formed by the mirror 12.

The actuating mechanism for a shutter release shaft 75 comprises a bell crank 76 pivotally mounted on the camera at 77 and resiliently biased in the direction of the arrow C. The bell crank 76 has one end 78 disposed in the path of a lug 79 formed by slide bar 49. Depression of the shutter-release button 51 causes the lug 79 to pivot the bell crank 76 with the other end 81 thereof pivotally moving a pin 82 of lever 83 secured to the shutter release shaft 75 for turning the shaft and releasing the shutter 7.

In the operation of this invention, the winding lever 11 is reciprocated advancing the film one frame and rotating the shutter-cocking shaft 66 by means of pinion 64, ring gear 63, gear 62, pinion 61, spindle 25, coupling 26, 27, shaft 24, pinion 23, rack 16, 22, pinion 15 and shaft 14 to cock the shutter 7. The shoulder 71 of disk 72 of the escapement is engaged by the lug 69 to prevent shutter 7 from running down when the release shaft 75 initially releases the shutter. As the shaft 24 and spindle 25 are rotated to cock shutter 7, the projection 29 and pin 31 urge slide bars 32, 33 against the bias of their springs 34, 35 causing the arms 36, 37 to engage rollers 38, 39 of the light flap 13 and mirror 12 to move the light flap and mirror into a viewing position. The end of slide bar 32 engages arm 46 of slide bar 45 urging the slide bar 45 against the bias of spring 40 to permit the light flap 13 to move into its position blocking the camera aperture and then is urged upwardly causing its upper end to move in front of the light flap 13 to releasably secure the light flap in the blocking position. As the mirror 12 is about to move into the viewing position, the cam 56 urges slide bar 54 against the bias of spring 70 causing the arm 58 to engage pin 59 and urge the pawl 52 against the bias of spring 60 permitting the mirror 12 to pass by pawl 52 and into the viewing position. When the mirror 12 reaches this position, the slide bar 54 is released causing pawl 52 to engage the flange 53 of mirror 12 to releasably hold the mirror. The T-shaped slide bar 41 whose arm 42 bears upon the edge of mirror 12 is urged by its spring in the direction of arrow A as the mirror 12 is moved downwardly causing its lower end to move in front of the light flap flange 44. The camera mechanism is at this time in the viewing position as shown in Fig. 5 with the subject to be photographed appearing on the viewing screen 9 of device 8. To make an exposure, the shutter release button 51 is depressed urging slide bar 49 against the bias of spring 50 causing: (1) the lug 79 to pivotally move lever 76 and turn shaft 75 releasing shutter 7 which however is prevented from running down by lever 67 and lug 69 of the escapement mechanism; (2) the lug 48 to withdraw slide bar 45 from in front of light flap 13; and (3) the lug 80 to engage arm 58 urging pin 59 and pawl 52 in a direction to release mirror 12. Although the slide bar 45 is withdrawn, the light flap 13 cannot be moved because of slide bar 41. The mirror 12 upon being released is urged upwardly by its spring causing lug 74 to strike the end 73 of lever 67 of the escapement mechanism withdrawing lug 69 from shoulder 71 and permitting shutter 7 to run down causing the shutter blades, not shown, to initially close and then to open and close to make the exposure. As soon as the shutter 7 has turned sufficiently to close the shutter blades, the edge of mirror 12 engages and urges arm 42 of slide bar 41 against the bias of its spring withdrawing its lower end 43 from in front of flange 44 and releasing the light blocking flap 13 which is urged upwardly by its spring. The release of the shutter 7 and flap 13 by the mirror 12 is made in timed relation so that the shutter while running down passes through its closed position during the time interval that the light flap 13 is released and moved into its uppermost position, and then opens and closes the shutter 7 to make the exposure.

Although but one embodiment has been illustrated and described, it will be apparent to those skilled in the art that various changes and modifications may be made therein without departing from the spirit of the invention or from the scope of the appended claims.

We claim:

1. In a single lens reflex camera having a camera body, a setting type shutter adapted during its run down from a cocked condition to move from an open position into a shutter closed position and then to open and close the shutter to make an exposure, an objective, a spring biased mirror and spring biased light blocking flap pivoted within said body behind the objective to move between an operative position in which they intercept light rays passing through the objective, and a normal inoperative position in which they are removed from the path of said light rays, the combination comprising: film winding means; control means connecting said film winding means to said mirror and light blocking flap; shutter setting means; clutch means releasably connecting said control means to said shutter setting means, said control means and said shutter setting means operable upon advance of the film by said film winding means to simultaneously cock said shutter and move said mirror and flap into said operative position; mirror retaining means for releasably holding said mirror in said operative position; flap retaining means controlled by said mirror for releasably holding said flap in said operative position; a latch for releasably holding said shutter setting means to prevent said shutter from operating when said shutter is released; and release means adapted to release said shutter and said mirror in timed relation, said mirror adapted as it is moved by its spring into said inoperative position to actuate and release said latch and said flap retaining means in timed relation whereby said shutter while running down from a cocked condition moves to its closed position during the time interval that said flap is released and moved into said inoperative position, said shutter then opening and closing to make an exposure.

2. The combination according to claim 1 wherein said control means comprises a shaft connected to said film winding means and carrying cam means for controlling said mirror and flap upon rotation of said shaft.

3. The combination according to claim 2 wherein said cam means comprises a disc having separate means thereon connected to, and for moving, said mirror and flap respectively into said operative position.

4. The combination according to claim 3 wherein said separate means comprises an arcuate projection mounted on one side of said disc, and a pin mounted on the other side.

5. The combination according to claim 1 wherein said control means comprises a shaft connected to said film winding means and carrying cam means for moving said mirror and flap upon rotation of said shaft, and said clutch means comprises a pin carried by said shaft adapted to operatively engage a finger formed by said shutter setting means.

6. The combination according to claim 1 wherein said latch comprises a spring biased lever pivotally mounted intermediate its ends, and having one of its ends cooperating with said shutter setting means, and its other end cooperating with said mirror.

7. The combination according to claim 1 wherein said latch comprises a spring biased lever pivotally mounted intermediate its ends, and having one of its ends biased into engagement with a shoulder formed by said shutter setting means, and its other end disposed in the path of and actuable by a lug formed by said mirror.

8. The combination according to claim 1 wherein said release means comprises a spring biased reciprocally movable bar having an adjustable lug adapted to actuate the mirror retaining means to release said mirror, and a shoulder formed by said bar adapted to actuate a linkage connected to said shutter to release the shutter.

9. The combination according to claim 1 wherein said control means comprises a shaft connected to said film winding means and about which a portion of said shutter setting means is rotatably mounted; means carried by said shaft for controlling said mirror and flap upon rotation of said shaft; said clutch means comprises a pin carried by said shaft adapted to operatively engage a finger formed by said portion of said shutter setting means; and said latch comprises a spring biased lever pivotally mounted intermediate its ends, and having one of its ends cooperating with said portion of said shutter setting means and its other end cooperating with said mirror.

10. The combination according to claim 9 wherein said means for controlling said mirror and flap comprises a disc having an arcuate projection mounted on one side and a pin mounted on the other side connected to, and for moving, said flap and mirror respectively into said operative position; and said portion of said shutter setting means forms a shoulder engageable by one of the ends of said lever, and the other end of said lever is disposed in the path of and actuable by a lug formed by said mirror.

References Cited in the file of this patent

UNITED STATES PATENTS

| | | |
|---|---|---|
| 2,348,510 | Aiken | May 9, 1944 |
| 2,579,247 | Angenieux | Dec. 18, 1951 |
| 2,730,025 | Faulhaber | Jan. 10, 1956 |

FOREIGN PATENTS

| | | |
|---|---|---|
| 25,849 | Great Britain | 1908 |
| 863,746 | Germany | Jan. 19, 1953 |
| 769,189 | Great Britain | Feb. 27, 1957 |